United States Patent [19]

Ruigrok

[11] Patent Number: 5,105,323
[45] Date of Patent: Apr. 14, 1992

[54] ANISTROPIC MAGNETIC LAYER FOR REDUCING THE SIGNAL TO NOISE RATIO BETWEEN A MAGNETIC HEAD AND A MOVEABLE INFORMATION CARRIER

[75] Inventor: Jacobus J. M. Ruigrok, Eindhoven, Netherlands

[73] Assignee: U.S. Philips Corporation, New York, N.Y.

[21] Appl. No.: 444,600

[22] Filed: Dec. 1, 1989

[30] Foreign Application Priority Data

Dec. 1, 1988 [NL] Netherlands ............... 8802960

[51] Int. Cl.$^5$ ............... G11B 5/187; G11B 5/127; H01F 1/00
[52] U.S. Cl. ............... 360/122; 360/125; 428/900
[58] Field of Search ............... 360/122, 125, 126; 428/900, 928

[56] References Cited

U.S. PATENT DOCUMENTS

| | | | |
|---|---|---|---|
| 3,845,503 | 10/1990 | Kanai | 360/125 |
| 4,576,876 | 3/1986 | Shiiki et al. | 360/132 |
| 4,726,988 | 2/1988 | Oka et al. | 428/307.3 |

Primary Examiner—A. J. Heinz
Assistant Examiner—Jefferson Evans
Attorney, Agent, or Firm—John C. Fox

[57] ABSTRACT

System comprising a magnetic head (1) and a magnetic information carrier (2), which cooperate with each other through a layer (3) with soft magnetic and lubricating properties. The layer (3) is anisotropic, the relative permeability ($\mu x$) of the layer, taken in a direction parallel to the head face (2), being less than the relative permeability ($\mu y$) of the layer in a direction perpendicular to the head face (9). By using the said layer in systems in which a certain distance between the magnetic head (1) and the information carrier (2) is desirable, the magnetic resistance is reduced and the signal-to-noise ratio is improved. The layer (3) may be present on both the magnetic head (1) and on the information carrier (2) as well as on both of them.

6 Claims, 1 Drawing Sheet

ANISTROPIC MAGNETIC LAYER FOR REDUCING THE SIGNAL TO NOISE RATIO BETWEEN A MAGNETIC HEAD AND A MOVEABLE INFORMATION CARRIER

BACKGROUND OF THE INVENTION

1. Field of the Invention

The invention relates to a system comprising a magnetic head and a movable information carrier, which through a soft magnetic layer with lubricating properties cooperate with each other, the magnetic head being provided with a transducing gap and a head face located opposite a plane of the information carrier.

2. Art Background

A system, of the type referred to above, is disclosed in the U.S. Pat. No. 3,432,837. Therein, the magnetic layer has one face located on the head face and the other plane is in contact with a magnetic tape. Because of the presence of the magnetic layer wear of the magnetic head and the information carrier is reduced.

The prior art system has the disadvantage that a portion of the magnetic flux withdrawn is fed back again to the magnetic tape via a short-circuit path, as a result of which the signal-to-noise ratio is not optimal.

SUMMARY OF THE INVENTION

The invention has inter alia for its object to improve the prior art system to such an extent that the signal-to-noise ratio is significantly improved. To this end, the invention is characterized, in that the said layer is anisotropic, in that the relative permeability ($\mu x$) of the layer in a direction at least substantially parallel to the head face and in the direction of travel of the information carrier is less than the relative permeability ($\mu y$) of the layer at least substantially perpendicular to the head face. Such anisotropy is achieved, for example, by applying a magnetic field aligned in the y direction to the layer. This means inter alia that the magnetic resistance in the said layer in a direction perpendicular to the head face of the magnetic head is less than the magnetic resistance parallel to the direction of travel of the information carrier. Consequently, also the magnetic resistance between the information carrier and the magnetic head is smaller than the resistance in the direction of travel perpendicular thereto, preventing further leakage flux losses, so that flux originating from the information carrier flows through to the magnetic head.

A further advantageous embodiment of the system according to the invention is characterized in that the following relation is satisfied:

$$\frac{\mu_x \cdot t}{h} \cdot \left(1 - \frac{\eta}{\eta^{int}}\right) < 1, \quad (1)$$

wherein $\mu_x$ is the relative permeability of the said soft magnetic layer, in a direction at least substantially parallel to the head face and in the direction of travel of the information carrier, t is the thickness of a layer, h is the gap height, $\eta$ is the efficiency of the head without the presence of the said layer, which efficiency is defined as the relationship between the magnetic scalar potential over the gap and the magnetic source potential, and $\eta^{int}$ is the internal efficiency of the magnetic head.

Significantly, it has been determined that adherence to Eq. (1) results in a substantial reduction in the loss of efficiency otherwise produced by the soft magnetic layer, i.e., adherence serves to compensate for the partial short-circuiting of the magnetic head by the magnetic layer. The soft magnetic layer with lubricating properties may be either a solid layer or a layer which is akin to a lubricating grease, thus having properties similar to those of a liquid. If it is a solid state layer, which includes for example iron oxide particles, the layer can be applied by sputtering. If it is a layer having properties similar to those of a liquid, the layer can, for example, be formed by iron oxide particles dispersed in oil or water. In the latter case the layer is usually required to be only in contact with one of the said faces of the magnetic head and the information carrier. Should the layer be in contact with both faces, the layer might deform due to the relative movement of the faces with respect to each other, because of which the anisotropy might get lost.

The invention also relates to a magnetic head and an information carrier which are suitable for use in the system according to the invention.

BRIEF DESCRIPTION OF THE DRAWINGS

The invention will now be described in greater detail by way of example, with reference to an embodiment shown in the accompanying drawings.

Herein.

DETAILED DESCRIPTION

Figure 1:
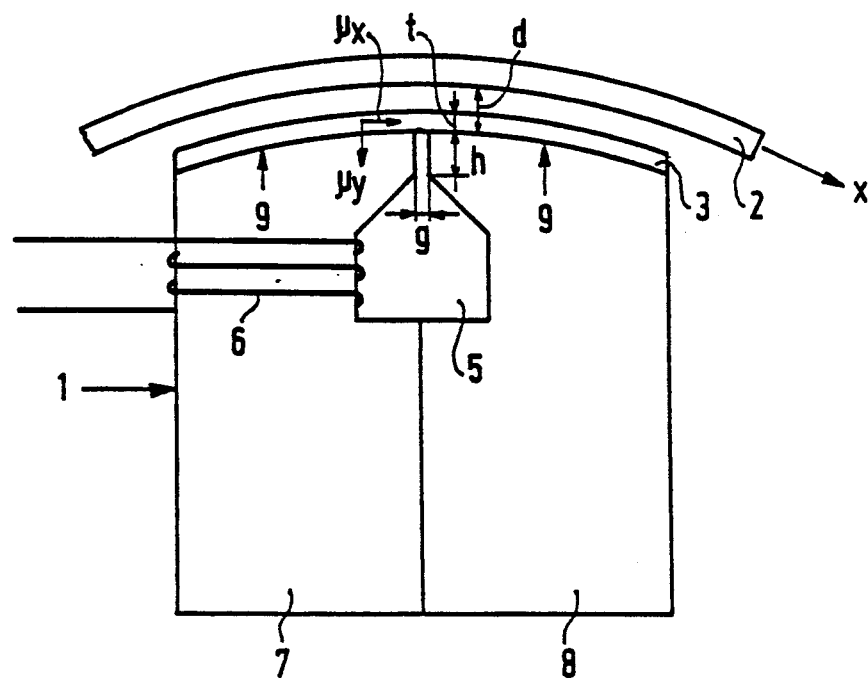
FIG. 1 shows an embodiment of the system according to the invention.

FIG. 1 shows a system according to the invention comprising a magnetic head 1 and a magnetic information carrier 2 movable in a direction x, which is positioned at a distance d from the magnetic head. The magnetic head comprises two core limbs 7, 8 and is provided with a transducing gap 4, a head face 9 and a winding aperture 5. A coil 6 is wrapped around core limb 7. Between the magnetic head and the information carrier a layer 3, with soft magnetic and lubricating properties, is located. This layer may be made of a solid substance or a liquid-like substance. An example of a suitable substance is oil or water, in which iron oxide particles are dispersed. In this embodiment layer 3 is located on the magnetic head 1 and a layer of air is present between the layer 3 and the information carrier 2.

Figure 2:
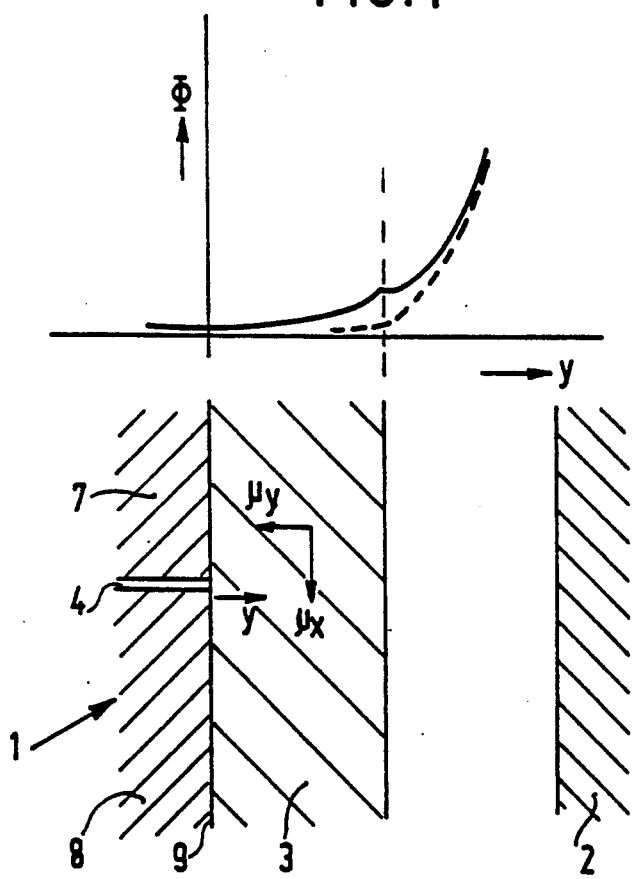
FIG. 2 is a graphic representation of the curve of the magnetic flux between the magnetic head and the information carrier.

The magnetic flux, which during reading flows from the information carrier, senses as it were the layer 3, because of which less leakage flux will occur in the thin layer of air still present between the information carrier 2 and the layer 3 (see FIG. 2) and more flux will be transferred to the layer 3. The flux subsequently flows into the magnetic head, which is manufactured from a material, for example MnZn-ferrite, sendust (FeSiAl), permalloy (NiFe), with a still higher permeability than the permeability of the layer 3. In FIG. 2, y indicates the distance to the magnetic head 1. The broken line indicates the flux 0 for the case in which no layer is present. The solid line indicates the flux 0 for the case in which the layer is located on the magnetic head 1.

It is of course also possible to apply the soft magnetic layer with lubricating properties on the plane of the information carrier facing the magnetic head. The most advantageous effect is obtained when the layer fills the whole space between the magnetic head and the information carrier. In this case less flux is short-circuited in the inner parts of the information carrier and thus more flux reaches the space between the information carrier and the magnetic head. Herein the soft magnetic layer may be deposited either fully on the information carrier or fully on the head face of the magnetic head or on both.

If layer 3 is an anisotropic layer in which the permeability $\mu y$ (see FIG. 1) exceeds the permeability $\mu x$, then the resistance which the flux meets while flowing from the information carrier to the magnetic head will be reduced even further as regards the resistance which the flux meets in a direction perpendicular to this direction.

Because of the presence of such a soft magnetic layer between the magnetic head and the information carrier, the efficiency of the system is decreased. To reduce the loss of efficiency as a result of partly short-circuiting magnetic head 1 by soft magnetic layer 3, the relation defined in Eq. (1) must be satisfied. In this situation the scalar potential over the gap equals the product of H and g, in which H is the field strength in the gap in A/m as a result of a current I in A through the windings and g is the gap length in m and the magnetic source potential equals the product of N and I, in which N is the number of turns of coil 6. In the case of a magneto-resistant head N represents one fictional turn which is then made up of a flat conducting strip wound tightly around the magneto-resistant element, through which current I flows in a uniform current density. $\eta^{int}$ represents the internal efficiency of the magnetic head, i.e. the efficiency of the head if the gap length of the head were large.

The system described in the foregoing, in which the magnetic head is not in contact during operation with the information carrier, is especially applied in recording systems utilizing a hard magnetic disc as the information carrier. In such systems the magnetic disc is driven rotationally, and the magnetic head is moved in a radial direction relative to the rotating disc. However, the system according to the invention is also applicable in recording systems in which the magnetic head is in contact with the information carrier. The magnetic head, in the example given an inductive head, may also be structured as a magneto-resistant head.

I claim:

1. A system including a magnetic head and a movable magnetic information carrier, the magnetic head having a transducing gap and a head face located opposite a plane of the information carrier, the system additionally comprising:

(a) a soft anisotropic magnetic layer with lubricating properties disposed between the magnetic head face and the information carrier, such that the relative permeability of the magnetic layer in a direction at least substantially parallel to the head face and in the direction of travel of the information carrier, is less than the relative permeability of the magnetic layer in a direction at least substantially perpendicular to the head face.

2. A system as claimed in claim 1, wherein the following relation is satisfied:

$$\frac{\mu_x \cdot t}{h} \cdot \left(1 - \frac{\eta}{\eta^{int}}\right) < 1$$

wherein $\mu_x$ is the relative permeability of the said soft magnetic layer, in a direction at least substantially parallel to the head face and in the direction of travel of the information carrier, t is the thickness of a layer, h is the gap height, $\eta$ is the efficiency of the head without the presence of the said layer, which efficiency is defined as the relationship between the magnetic scalar potential over the gap and the magnetic source potention, and $\eta^{int}$ is the internal efficiency of the magnetic head.

3. A system as claimed in claim 1 wherein the soft magnetic layer comprises particles dispersed in a liquid.

4. A system as claimed in claim 1, wherein said magnetic head includes said soft magnetic layer.

5. A system as claimed in claim 1, wherein said movable magnetic information carrier includes said soft magnetic layer.

6. A system as claimed in claim 1, wherein said movable magnetic information carrier includes a hard disk.

* * * * *